(12) United States Patent
Lee et al.

(10) Patent No.: US 10,254,448 B2
(45) Date of Patent: Apr. 9, 2019

(54) LIGHT MODULATION DEVICE INCLUDING DIELECTRIC ANTENNA

(71) Applicant: SAMSUNG ELECTRONICS CO., LTD., Suwon-si (KR)

(72) Inventors: Duhyun Lee, Yongin-si (KR); Sunil Kim, Osan-si (KR); Changgyun Shin, Anyang-si (KR); Jungwoo Kim, Hwaseong-si (KR); Chang bum Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/194,739

(22) Filed: Jun. 28, 2016

(65) Prior Publication Data

US 2017/0176651 A1  Jun. 22, 2017

(30) Foreign Application Priority Data

Dec. 17, 2015 (KR) .................. 10-2015-0181078

(51) Int. Cl.
| | |
|---|---|
| *G02B 5/00* | (2006.01) |
| *G02F 1/19* | (2019.01) |
| *G02F 1/295* | (2006.01) |
| *G02F 1/29* | (2006.01) |

(52) U.S. Cl.
CPC ............. *G02B 5/008* (2013.01); *G02F 1/19* (2013.01); *G02F 1/292* (2013.01); *G02F 1/2955* (2013.01); *G02F 2202/30* (2013.01); *G02F 2203/12* (2013.01)

(58) Field of Classification Search
CPC ............ G02B 5/008; G02F 1/292; G02F 1/19

USPC ......................... 351/244, 241, 240
See application file for complete search history.

(56) References Cited

U.S. PATENT DOCUMENTS

| | | | |
|---|---|---|---|
| 6,738,112 B1 * | 5/2004 | Sekiguchi | G02F 1/133504 349/63 |
| 6,842,217 B1 * | 1/2005 | Miller | G02F 1/216 349/123 |
| 8,018,375 B1 | 9/2011 | Alexopoulos et al. | |
| 8,698,096 B2 | 4/2014 | Chen | |
| 8,711,643 B2 | 4/2014 | Han et al. | |
| (Continued) | | | |

FOREIGN PATENT DOCUMENTS

| | | |
|---|---|---|
| KR | 1020150059453 A | 6/2015 |
| KR | 1020150090035 A | 8/2015 |
| WO | 2015187221 A2 | 12/2015 |

OTHER PUBLICATIONS

Andrey Komar et al., "Electrical tuning of all dielectric metasurfaces", 10th International Congress on Advanced Electromagnetic Materials in Microwaves and Optics—Metamaterial 2016, Crete, Greece, Sep. 17-22, 2016, 2016 IEEE, (p. 187-189) XP033009949.

(Continued)

*Primary Examiner* — Tuyen Tra
(74) *Attorney, Agent, or Firm* — Sughrue Mion, PLLC

(57) ABSTRACT

A light modulation device includes a dielectric antenna and a refractive-index-variable layer which faces the dielectric antenna and comprises a material having a refractive index that changes according to a signal. A light may be modulated, since resonance characteristics of the dielectric antenna are controlled according to a refractive-index change of the refractive-index-variable layer.

22 Claims, 7 Drawing Sheets

(56) References Cited

U.S. PATENT DOCUMENTS

2013/0314765 A1 11/2013 Padilla et al.
2015/0146180 A1 5/2015 Lee et al.
2015/0255639 A1 9/2015 Pelouard et al.

OTHER PUBLICATIONS

Communication dated Apr. 24, 2017, issued by the European Patent Office in counterpart European Application No. 16203630.5.
Jurgen Sautter et al: "Active Tuning of All-Dielectric Metasurfaces", ACS NANO, vol. 9, No. 4, Apr. 28, 2015, XP55363559, p. 4308-4315 (8 pages total).
Manuel Decker et al: "Electro-optical switching by liquid-crystal controlled metasurfaces", Optics Express, vol. 21, No. 7, Apr. 3, 2013, XP55363947, (7 pages total).
Jeremiah P. Turpin et al: "Reconfigurable and Tunable Metamaterials: A Review of the Theory and Applications", International Journal of Antennas and Propagation, vol. 11, No. 4, Jan. 1, 2014, XP055307748, (19 pages total).
Longfang Zou et al: "Spectral and angular characteristics of dielectric resonator metasurface at optical frequencies" Applied Physics Letters, A I P Publishing LLC, US, vol. 105, No. 19, Nov. 10, 2014, XP012191821, (4 pages total).
Van De Groep, et al., "Designing dielectric resonators on substrates: Combining magnetic and electric resonances", Oct. 2013, Optics Express, vol. 21, Issue 22, pp. 26285-26302.

* cited by examiner

LIGHT MODULATION DEVICE INCLUDING DIELECTRIC ANTENNA

CROSS-REFERENCE TO RELATED APPLICATION

This application claims the benefit of Korean Patent Application No. 10-2015-0181078, filed on Dec. 17, 2015, in the Korean Intellectual Property Office, the disclosure of which is incorporated herein in its entirety by reference.

BACKGROUND

1. Field

Apparatuses and methods consistent with exemplary embodiments relate to light modulation devices that modulate light.

2. Description of the Related Art

Optical elements that change transmission, reflection, polarization, phase, intensity, and path of incident light have been used in various optical devices. Optical modulators used in optical systems have various structures for controlling these properties in a desired manner.

For example, anisotropic liquid crystals and microelectromechanical system (MEMS) structures, using fine mechanical movement to block light or control reflection elements, as well as other elements, have been widely used in typical optical modulators. However, operating response times of such optical modulators are slow and may reach more than several μs according to known methods of driving optical modulators.

It is desired to utilize nano-antennas that utilize surface plasmon resonance (SPR) phenomenon, which occurs in a boundary between a metallic layer and a dielectric layer, in conjunction with optical modulators.

SUMMARY

One or more exemplary embodiments may provide a light modulation device that modulates light and has small light loss and a wide control range of light modulation.

Additional exemplary aspects will be set forth in part in the description which follows and, in part, will be apparent from the description, or may be learned by practice of the presented embodiments.

According to an aspect of an exemplary embodiment, there is provided a light modulation device, the light modulation device including: a dielectric antenna and a refractive-index-variable layer which faces the dielectric antenna and comprises a material having a refractive index that changes according to a signal applied thereto.

A width of a cross-section of the dielectric antenna may be equal to or less than $\lambda/2$ if a wavelength of light to be modulated by the light modulation device is $\lambda$.

The refractive index of the refractive-index-variable layer may be less than a refractive index of the dielectric antenna.

The dielectric antenna may include a material having a dielectric constant that is greater than about 10.

The refractive-index-variable layer may include a material having a refractive index that changes according to an electric signal.

The light modulation device may further include first and second conductive layers, to which a voltage for forming an electric field in the refractive-index-variable layer is applied.

The light modulation device may further include a signal application means configured to apply a signal to the refractive-index-variable layer, thereby causing a change in the refractive index of the refractive-index-variable layer.

The signal application means may include a voltage source configured to apply a voltage between the first and second conductive layers.

The dielectric antenna may be arranged on the refractive-index-variable layer, the first conductive layer may be arranged between the dielectric antenna and the refractive-index-variable layer, and the second conductive layer may be arranged under the refractive-index-variable layer.

The first conductive layer may include transparent conductive oxide.

The second conductive layer may include a metallic layer.

The second conductive layer may include transparent conductive oxide.

The light modulation device may further include a dielectric mirror arranged under the second conductive layer.

The light modulation device may further include a spacer layer arranged between the refractive-index-variable layer and the second conductive layer.

The spacer layer may include a dielectric material having a refractive index smaller than a refractive index of the dielectric antenna.

The refractive-index-variable layer may be arranged on the dielectric antenna, the first conductive layer may be arranged on the refractive-index-variable layer, and the second conductive layer may be arranged under the dielectric antenna.

The first conductive layer may include transparent conductive oxide.

The second conductive layer may include a metallic material.

The second conductive layer may include transparent conductive oxide.

The light modulation device may further include a dielectric mirror arranged under the second conductive layer.

The light modulation device may further include a spacer layer arranged between the dielectric antenna and the second conductive layer.

The spacer layer may include a dielectric material having a refractive index smaller than a refractive index the dielectric antenna.

The dielectric antenna may include a plurality of dielectric antenna cells, and the refractive-index-variable layer may include a plurality of refractive-index-variable cells that face the plurality of dielectric antenna cells, respectively.

The light modulation device may further include a refractive-index change adjustment unit configured to adjust a refractive-index change of each of the plurality of refractive-index-variable cells.

The refractive-index change adjustment unit may include a plurality of pairs of electrode portions, each of which being configured to have the plurality of refractive-index-variable cells therebetween, and a controller configured to control a voltage applied to each of the plurality of pairs of electrode portions.

The controller may be further configured to control a voltage to be applied to the plurality of pairs of electrode portions such that the light modulation device modulates an intensity of incident light.

The controller may be further configured to control a voltage to be applied to the plurality of pairs of electrode portions such that the light modulation device modulates a phase of incident light.

The controller may be further configured to control a voltage to be applied to the plurality of pairs of electrode portions such that phase modulation distribution has a stepwise form.

According to an aspect of another exemplary embodiment, there is provided a light modulation device, the light modulation device including: a plurality of Mie resonance structures having controllable resonance characteristics and a controller configured to control resonance characteristics of each of the plurality of Mie resonance structures.

The controller may be further configured to control the resonance characteristics such that at least one of a phase and an intensity of incident light is modulated differently according to a position.

The light modulation device may be a beam steering device.

The light modulation device may be a beam shaping device.

According to an aspect of another exemplary embodiment, there is provided an optical device including a light modulation device, the light modulation device including: a dielectric antenna and a refractive-index-variable layer which faces the dielectric antenna and comprises a material having a refractive index that changes according to a signal.

According to an aspect of another exemplary embodiment, there is provided a light modulation device, the light modulation device including: a nano-antenna layer comprising a dielectric material, a refractive-index-variable layer which faces the nano-antenna layer and comprises a material having a refractive index that changes according to a signal, and first and second conductive layers to which a voltage for forming an electric field in the refractive-index-variable layer is applied, the first and second conductive layers being arranged to have the refractive-index-variable layer therebetween.

The nano-antenna layer may include the dielectric material having a dielectric constant that is greater than about 10.

The light modulation device may further include a signal application means configured to apply a signal to the refractive-index-variable layer, thereby causing a change in the refractive index of the refractive-index-variable layer.

The refractive-index-variable layer may include an electro-optic material having a refractive index that changes according to an electric signal applied thereto.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
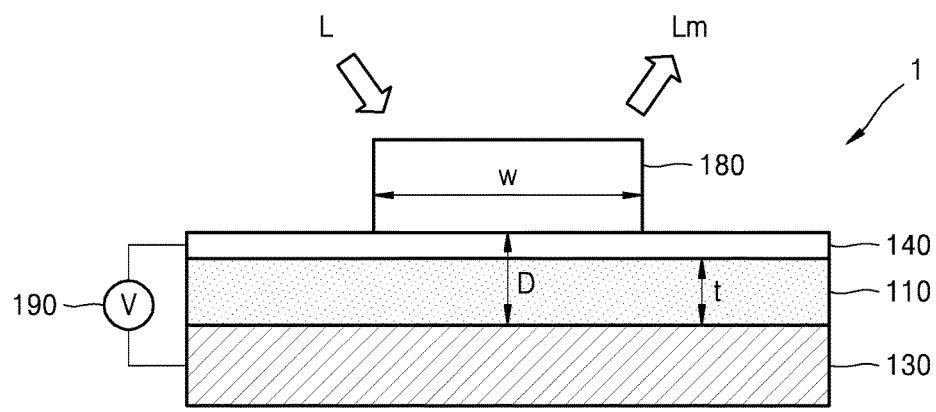
FIG. 1 is a cross-sectional view illustrating a schematic structure of a light modulation device according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinafter, exemplary embodiments will be described with reference to the accompanying drawings. Throughout the drawings, each element may be exaggerated in size for clarity and convenience of explanation. Accordingly, the exemplary embodiments are merely illustrative, and various modifications may be possible from the exemplary embodiments.

In a layer structure, when a constituent element is disposed "above" or "on" another constituent element, the constituent element may be only directly on the other constituent element or above the other constituent elements in a non-contact manner.

The term such as "first", "second", or the like may be used to describe various elements, but the elements should not be limited by the term. The term is used only to distinguish an element from another element.

As used herein, the singular forms "a," "an," and "the" may include of the plural forms as well, unless the context clearly indicates otherwise. Throughout the entirety of the specification, if it is assumed that a certain part includes a certain component, the term 'includes' means that a corresponding component may further include other components unless a specific meaning opposed to the corresponding component is written.

When a part "includes" an element, the part may include another element, unless otherwise defined. The term used in the exemplary embodiments such as "unit" or "module" indicates a unit for processing at least one function or operation, and may be implemented in hardware, software, or in a combination of hardware and software. Also, well-known functions or constructions are not described in detail since they would obscure the exemplary embodiments with unnecessary detail.

Figure 2:
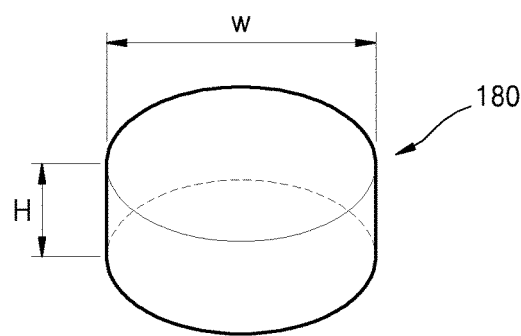
FIG. 2 illustrates an example of a shape of a dielectric antenna of the light modulation device according to an exemplary embodiment.

FIG. 1 is a cross-sectional view showing a schematic structure of a light modulation device 1 according to an exemplary embodiment, and FIG. 2 illustrates an example of a shape of a dielectric antenna 180 of the light modulation device 1 according to an exemplary embodiment.

Referring to FIG. 1, the light modulation device 1 modulates light L into modulated light Lm and outputs the modulated light Lm. The light modulation device 1 may include the dielectric antenna 180 and a refractive-index-variable layer 110 that faces the dielectric antenna 180 and includes a material having a refractive index varying with an external signal.

The dielectric antenna 180 is proposed to have a high antenna efficiency using Mie resonance based on displacement current. The dielectric antenna 180 may have a shape with dimensions of a sub-wavelength and a high dielectric constant, for example, a dielectric constant higher than a dielectric constant of the refractive-index-variable layer 110.

The term "sub-wavelength" indicates a dimension smaller than a wavelength of light to be modulated by the light modulation device 1. For example, if the wavelength of the light to be modulated by the light modulation device 1 is about λ, the sub-wavelength may indicate a dimension that is equal to or less than about λ/2. A width W of the dielectric antenna 180, that is, the width W of a cross-section that is parallel to the refractive-index-variable layer 110 may be equal to or less than about λ/2. The dielectric antenna 180 may have a cylindrical shape having a diameter of W and a height of H, as shown in FIG. 2. However, the shape of the dielectric antenna 180 is not limited thereto and may have a polyprism shape and have a cross-section of a polyhedral shape such as a cross or a star.

The dielectric antenna 180 may have a refractive index higher than a refractive index of the refractive-index-variable layer 110. For example, the dielectric antenna 180 may have a refractive index higher than the highest refractive index falling within a refractive-index change range of the refractive-index-variable layer 110. A dielectric constant of the dielectric antenna 180 may be, for example, greater than about 10.

The refractive-index variable layer 110 may include a material having optical characteristics that vary according to an external signal. The external signal may be an electric signal. The refractive-index variable layer 110 may include an electro-optic material having a refractive index that varies according to an effective dielectric constant if the electric signal is applied to the refractive-index variable layer 110. For the electro-optic materials, $LiNbO_3$, $LiTaO_3$ KTN (potassium tantalate niobate), PZT (lead zirconate titanate), or the like may be used, and various polymer materials having electro-optic characteristics may also be used.

The external signal is not limited to the electric signal. A material having a dielectric constant that varies due to an occurrence of a phase transition at a predetermined temperature or higher upon application of heat, for example, $VO_2$, $VO_2O_3$, EuO, MnO, CoO, $CoO_2$, $LiCoO_2$, or $Ca_2RuO_4$, may be used for the refractive-index variable layer 110.

The light modulation device 1 may include a conductive layer to which a voltage for forming an electric field on the refractive-index variable layer 110 is applied. A metallic layer 130 is arranged under the refractive-index variable layer 110, and a transparent conductive layer 140 is arranged on the refractive-index variable layer 110.

The metallic layer 130 may function as a reflective layer which reflects light as well as an electrode which applies a voltage. A material of the metallic layer 130 may include at least one selected from among Cu, Al, Ni, Fe, Co, Zn, Ti, ruthenium (Ru), rhodium (Rh), palladium (Pd), platinum (Pt), silver (Ag), osmium (Os), iridium (Ir), and gold (Au).

The transparent conductive layer 140 may include transparent conductive oxide (TCO) such as indium tin oxide (ITO), indium zinc oxide (IZO), aluminum zinc oxide (AZO), or gallium zinc oxide (GZO).

To vary the refractive index of the refractive-index-variable layer 110, the light modulation device 1 may further include a signal application means which applies an external signal to the refractive-index-variable layer 110. The signal application means may be, but is not limited thereto, a voltage source 190 which applies a voltage between the transparent conductive layer 140 and the metallic layer 130 to form an electric field in the refractive-index variable layer 110.

A thickness t of the refractive-index variable layer 110 is set such that a distance D from the dielectric antenna 180 to the metallic layer 130 satisfies some requirements. The distance D may be, for example, an integral multiple of λ/4 when a wavelength of light to be modulated is λ.

The light modulation device 1 including the dielectric antenna 180 has an efficiency higher than an optical modulator having a plasmonic antenna. The dielectric antenna 180 has small optical loss, compared to a plasmonic antenna including a metallic material. In addition, the plasmonic antenna uses interfacial characteristics between the metallic material and an insulator, whereas the dielectric antenna 180 uses resonance based on bulk characteristics which provides a wide control range of light modulation.

Moreover, since a nano structure is formed using a dielectric material to manufacture the light modulation device 1, the light modulation device 1 may be more easily processed than an optical modulator including a plasmonic antenna.

Figure 3:
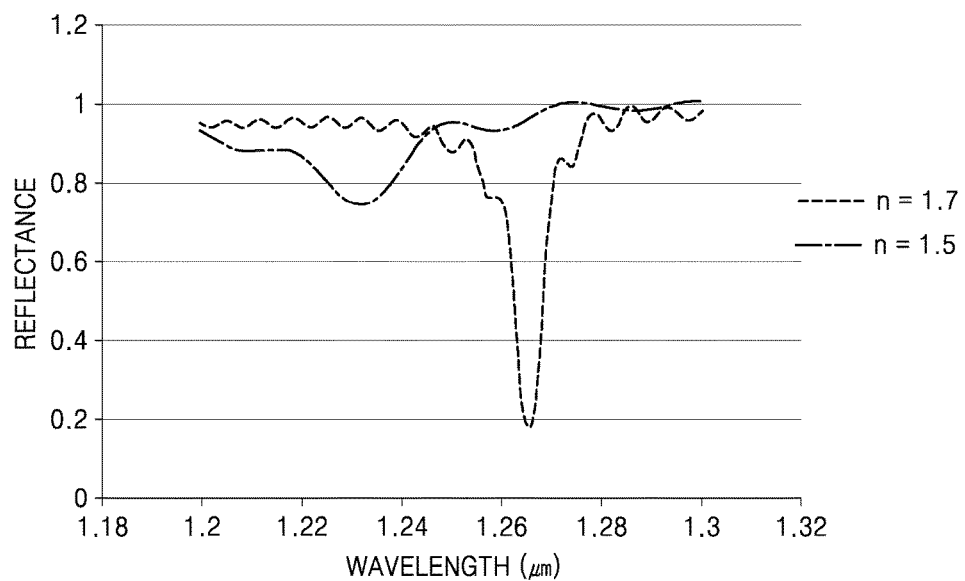
FIG. 3 is a graph showing a computer simulation of a reflectance with respect to a wavelength for two refractive indices of a refractive-index-variable layer in a light modulation device according to an exemplary embodiment.

FIG. 3 is a graph showing a computer simulation of a reflectance with respect to a wavelength for two refractive indices of the refractive-index-variable layer 110 in the light modulation device 1 according to an exemplary embodiment.

In the computer simulation, a refractive index of the dielectric antenna 180 is assumed to be about 3.7.

Referring to the graph, when a refractive index of the refractive-index-variable layer 110 is about 1.7, a reflectance sharply decreases near a wavelength of about 1.26 μm. It can be seen from the result that by changing the refractive index of the refractive-index variable layer 110, light having a wavelength of about 1.26 μm may be on/off or may be intensity-modulated.

Figure 4:
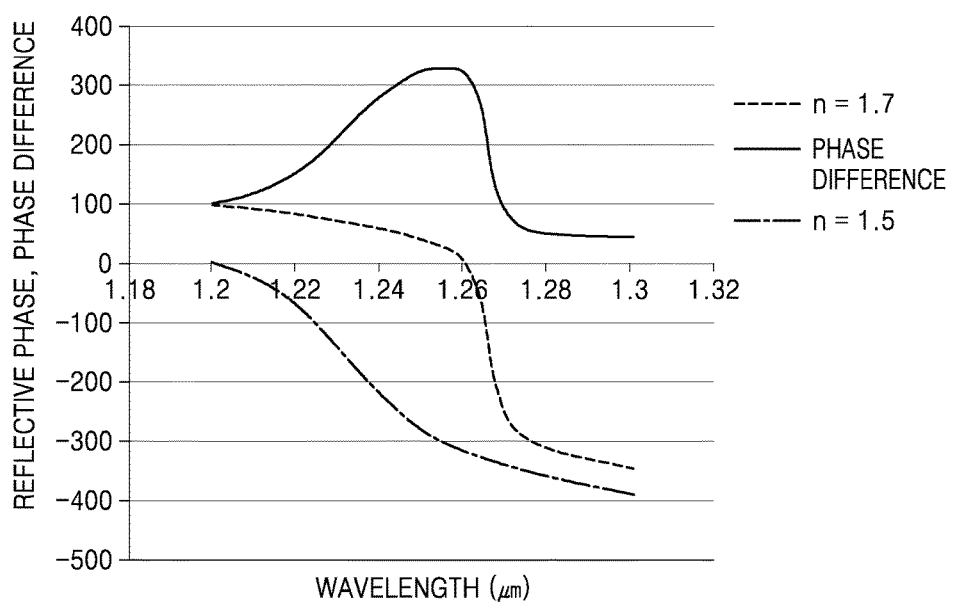
FIG. 4 is a graph showing a computer simulation of a phase change with respect to a wavelength for two refractive indices of a refractive-index-variable layer in a light modulation device according to an exemplary embodiment.

FIG. 4 is a graph showing a computer simulation of a phase change with respect to a wavelength for two refractive indices of the refractive-index-variable layer 110 in the light modulation device 1 according to an exemplary embodiment.

In the computer simulation, the refractive index of the dielectric antenna 180 is assumed to be about 3.7.

Referring to the graph, a phase difference between the cases that the refractive-index-variable layer 110 has a refractive index of 1.7 and that the refractive-index-variable layer 110 has a refractive index of 1.5 is about 50° to about 310°. The phase difference may include an additional phase difference in addition to an optical length difference based on a refractive index change of the refractive-index-variable layer 110, and may be analyzed as originating from magnetic dipole mode resonance in the dielectric antenna 180. From this result, it can be seen that by changing the refractive index of the refractive-index-variable layer 110, a desired phase difference may be induced with respect to light in a wavelength band of interest.

Hereinafter, a structure of a light modulation device according to various exemplary embodiments will be described.

Figure 5:
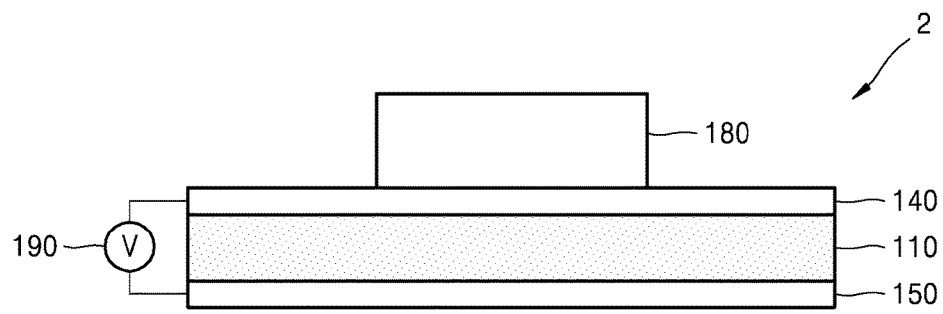
FIG. 5 is a cross-sectional view illustrating a schematic structure of a light modulation device according to another exemplary embodiment.

FIG. 5 is a cross-sectional view illustrating a schematic structure of a light modulation device 2 according to another exemplary embodiment.

The light modulation device 2 may include the refractive-index-variable layer 110, the dielectric antenna 180, and transparent conductive layers 140 and 150 which are arranged on and under the refractive-index-variable layer 110, respectively. Each of the transparent conductive layers 140 and 150 may include transparent conductive oxide, for example, indium tin oxide (ITO), indium zinc oxide (IZO), aluminum zinc oxide (AZO), or gallium zinc oxide (GZO). If a voltage is applied between the transparent conductive layers 140 and 150 by the voltage source 190, the refractive index of the refractive-index-variable layer 110 changes and resonance characteristics of the dielectric antenna 180 are adjusted.

While the light modulation device 1 of FIG. 1 operates in a reflective mode, the light modulation device 2 according to the current embodiment, as shown in FIG. 2, operates in a transmissive mode by using a transparent material to form a voltage application electrode which forms an electric field on the refractive-index-variable layer 110.

Figure 6:
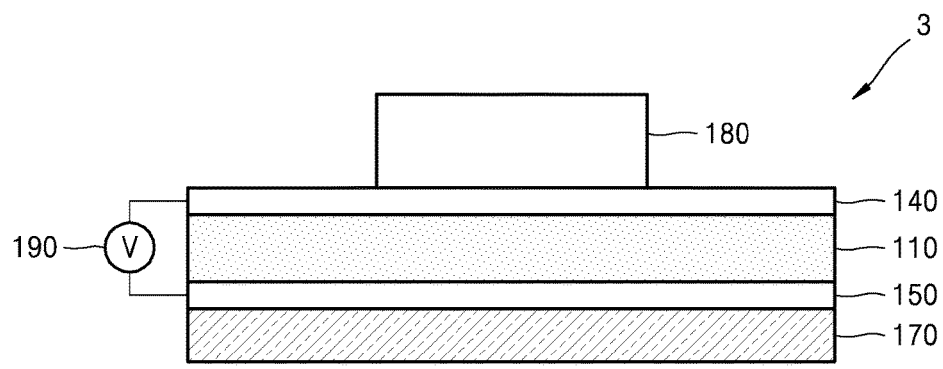
FIG. 6 is a cross-sectional view illustrating a schematic structure of a light modulation device according to another exemplary embodiment.

FIG. 6 is a cross-sectional view illustrating a schematic structure of a light modulation device 3 according to another exemplary embodiment.

The light modulation device 3 may include the refractive-index-variable layer 110, the dielectric antenna 180, and the transparent conductive layers 140 and 150 which are arranged on and under the refractive-index-variable layer 110, respectively. The voltage source 190 which applies a voltage between the transparent conductive layers 140 and 150 is disposed. The light modulation device 3 may further include a dielectric mirror 170 which is arranged under the transparent conductive layer 150. The dielectric mirror 170 may include a multi-layer dielectric layer having a refractive index and a thickness that are properly set, and may include, for example, a distributed Bragg reflector. The light modulation device 3 according to the current embodiment operates in a reflective mode like the light modulation device 1 of FIG. 1.

Figure 7:
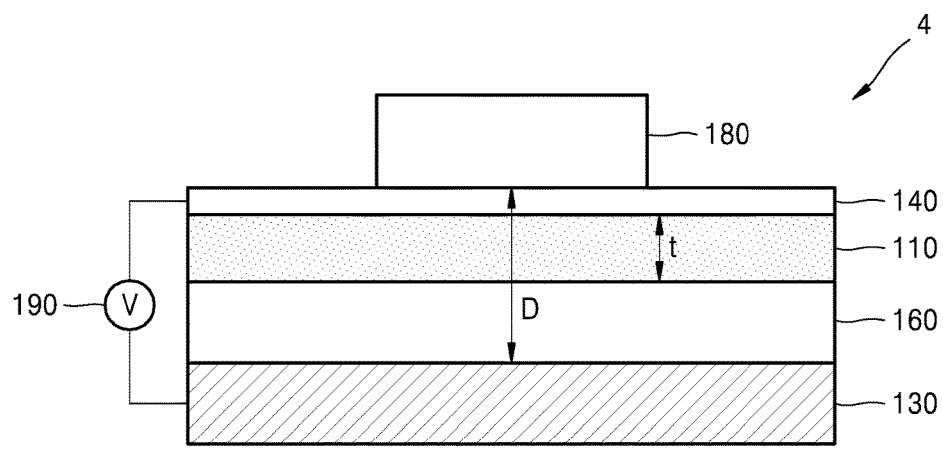
FIG. 7 is a cross-sectional view illustrating a schematic structure of a light modulation device according to another exemplary embodiment.

FIG. 7 is a cross-sectional view illustrating a schematic structure of a light modulation device 4 according to another exemplary embodiment.

The light modulation device 4 may include the refractive-index-variable layer 110, the dielectric antenna 180, the transparent conductive layer 140, and the metallic layer 130. To change the refractive index of the refractive-index-variable layer 110, the voltage source 190 which applies a voltage between the transparent conductive layer 140 and the metallic layer 130 is disposed.

The light modulation device 4 may further include a spacer layer 160 which is arranged between the metallic layer 130 and the refractive-index-variable layer 110. The spacer layer 160 may include a dielectric material and have, but is not limited thereto, a refractive index smaller than that of the dielectric antenna 180. The spacer layer 160 is disposed to adjust the distance D between the dielectric layer 180 and the metallic layer 130 to a desired dimension. For example, if either requirements for the thickness t of the refractive-index-variable layer 110 or requirements for the distance D between the dielectric antenna 180 and the metallic layer 130 do not comply with resonance characteristics of the dielectric antenna 180 at the same time, the spacer layer 160 having a refractive index smaller than that of the dielectric antenna 180 may be inserted to a proper thickness to implement desired resonance characteristics.

Figure 8:
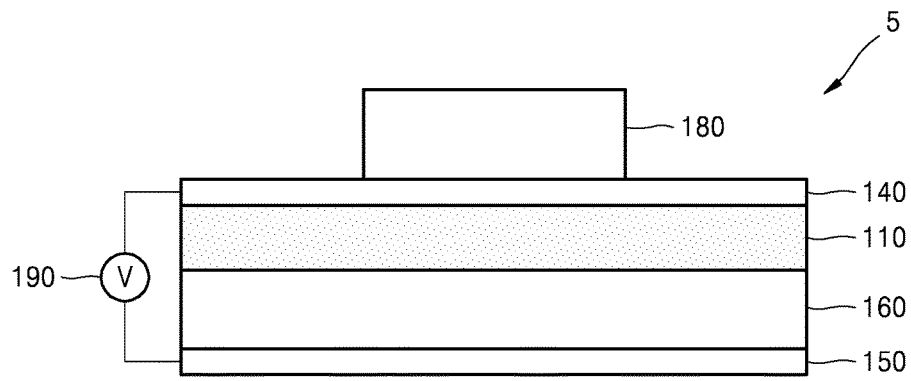
FIG. 8 is a cross-sectional view illustrating a schematic structure of a light modulation device according to another exemplary embodiment.

FIG. 8 is a cross-sectional view illustrating a schematic structure of a light modulation device 5 according to another exemplary embodiment.

The light modulation device 5 may include the refractive-index-variable layer 110, the dielectric antenna 180, and the transparent conductive layers 140 and 150 which are arranged on and under the refractive-index-variable layer 110, respectively. The voltage source 190 which applies a voltage between the transparent conductive layers 140 and 150 is disposed. The light modulation device 5 may further include the spacer layer 160 which is formed of a dielectric material and is arranged between the transparent conductive layer 150 and the refractive-index-variable layer 110.

While the light modulation device 4 of FIG. 7 operates in a reflective mode, the light modulation device 5 according to the current embodiment, as shown in FIG. 8, may operate in a transmissive mode by using a transparent material for a voltage application electrode which forms an electric field on the refractive-index-variable layer 110.

Figure 9:
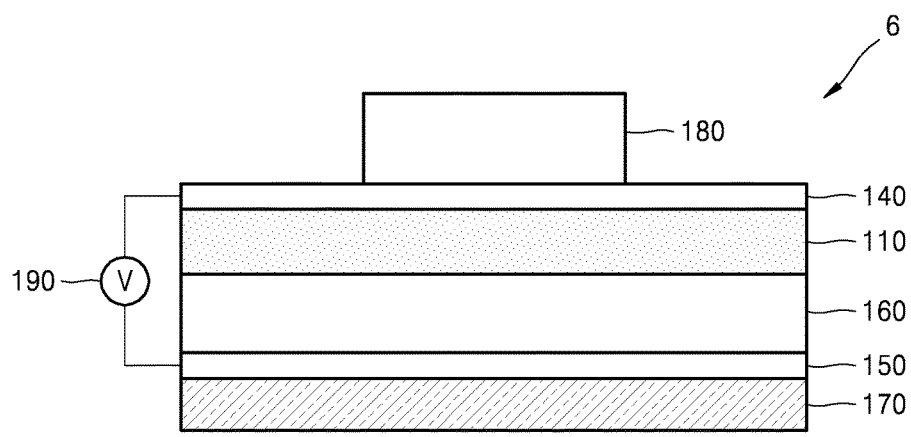
FIG. 9 is a cross-sectional view illustrating a schematic structure of a light modulation device according to another exemplary embodiment.

FIG. 9 is a cross-sectional view illustrating a schematic structure of a light modulation device 6 according to another exemplary embodiment.

The light modulation device 6 may include the refractive-index-variable layer 110, the dielectric antenna 180, and the transparent conductive layers 140 and 150 which are arranged on and under the refractive-index-variable layer 110, respectively. The voltage source 190 which applies a voltage between the transparent conductive layers 140 and 150 is disposed. The light modulation device 6 may further include the spacer layer 160 which is arranged between the transparent conductive layer 150 and the refractive-index variable layer 110. The spacer layer 160 may be formed of a dielectric material. The light modulation device 6 may further include the dielectric mirror 170 which is arranged under the transparent conductive layer 150. The dielectric mirror 170 may include a multi-layer dielectric layer and may include, for example, a distributed Bragg reflector.

Figure 10:
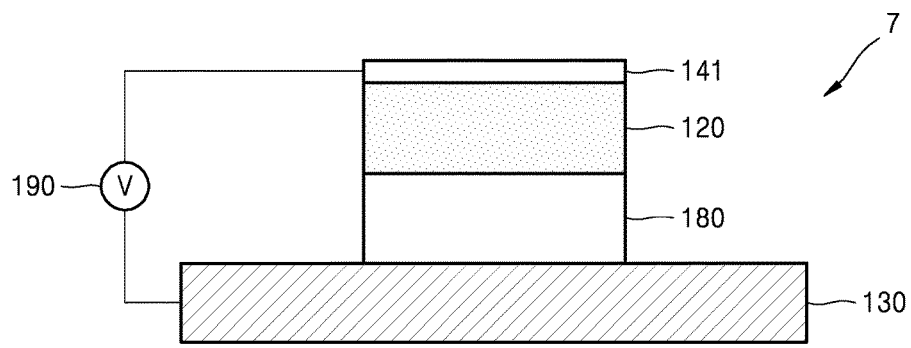
FIG. 10 is a cross-sectional view illustrating a schematic structure of a light modulation device according to another exemplary embodiment.

FIG. 10 is a cross-sectional view illustrating a schematic structure of a light modulation device 7 according to another exemplary embodiment.

The light modulation device 7 may include the dielectric antenna 180, a refractive-index-variable layer 120 arranged on the dielectric antenna 180, and a transparent conductive layer 141 and the metallic layer 130 arranged to have the dielectric antenna 180 and the refractive-index-variable layer 120 therebetween. The voltage source 190 which applies a voltage between the transparent conductive layer 141 and the metallic layer 130 is disposed.

The refractive-index-variable layer 120 is disposed on the dielectric antenna 180 to the same width as the dielectric antenna 180, and has the same shape of a cross-section that is perpendicular to a thickness direction thereof as that of the dielectric antenna 180. The transparent conductive layer 141 arranged on the refractive-index-variable layer 120 may have the same shape of a cross-section as that of the refractive-index-variable layer 120.

Figure 11:
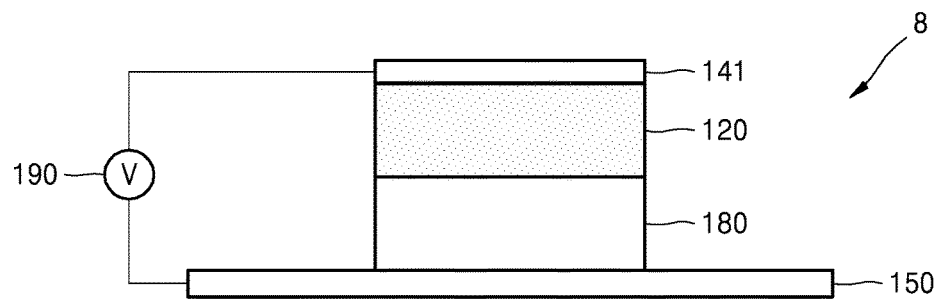
FIG. 11 is a cross-sectional view illustrating a schematic structure of a light modulation device according to another exemplary embodiment.

FIG. 11 is a cross-sectional view illustrating a schematic structure of a light modulation device 8 according to another exemplary embodiment.

The light modulation device 8 may include the dielectric antenna 180, the refractive-index-variable layer 120 arranged on the dielectric antenna 180, and the transparent conductive layers 141 and 150 arranged to have the dielectric antenna 180 and the refractive-index-variable layer 120 therebetween. The voltage source 190 which applies a voltage between the transparent conductive layers 141 and 150 is disposed.

The refractive-index-variable layer 120 is arranged on the dielectric antenna 180, and the transparent conductive layer 141 is arranged on the refractive-index-variable layer 120. The dielectric antenna 180, the refractive-index-variable layer 120, and the transparent conductive layer 141 may have the same shape of cross-sections that are perpendicular to a thickness direction thereof.

Figure 12:
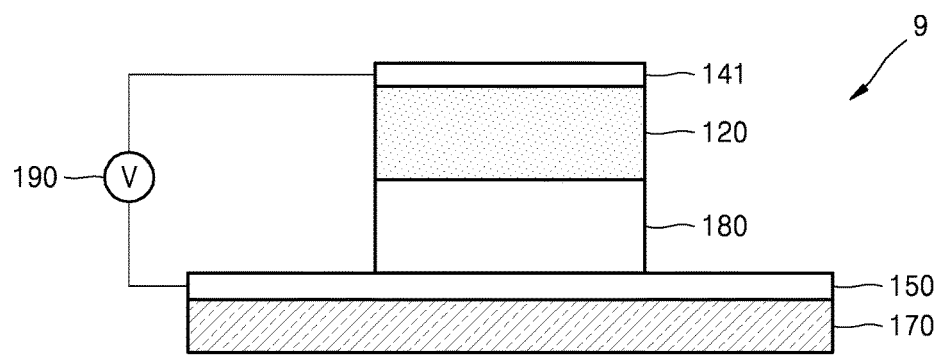
FIG. 12 is a cross-sectional view illustrating a schematic structure of a light modulation device according to another exemplary embodiment.

FIG. 12 is a cross-sectional view illustrating a schematic structure of a light modulation device 9 according to another exemplary embodiment.

The light modulation device 9 may include the dielectric antenna 180, the refractive-index-variable layer 120 arranged on the dielectric antenna 180, and the transparent conductive layers 141 and 150 arranged to have the dielectric antenna 180 and the refractive-index-variable layer 120 therebetween. The voltage source 190 which applies a voltage between the transparent conductive layers 141 and 150 is disposed.

The refractive-index-variable layer 120 is arranged on the dielectric antenna 180, and the transparent conductive layer 141 is arranged on the refractive-index-variable layer 120. The dielectric antenna 180, the refractive-index-variable layer 120, and the transparent conductive layer 141 may have the same shape of cross-sections that are perpendicular to a thickness direction thereof. The light modulation device 9 may further include the dielectric mirror 170 which is arranged under the transparent conductive layer 150.

Figure 13:
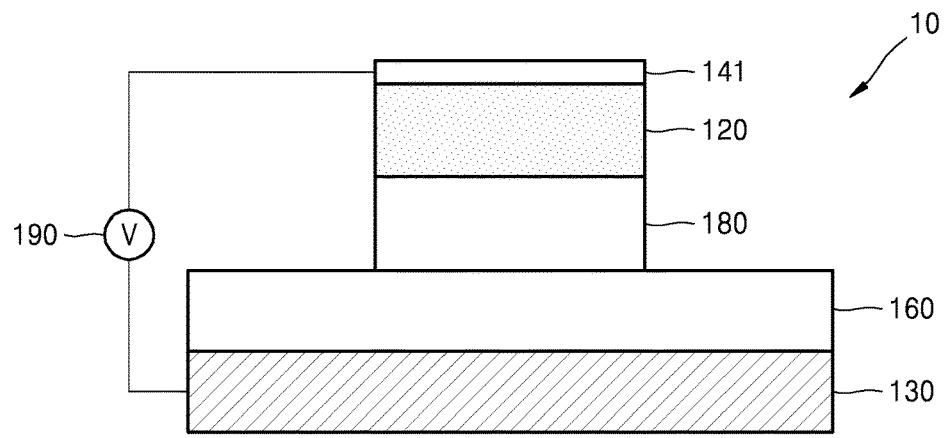
FIG. 13 is a cross-sectional view illustrating a schematic structure of a light modulation device according to another exemplary embodiment.

FIG. 13 is a cross-sectional view illustrating a schematic structure of a light modulation device 10 according to another exemplary embodiment.

The light modulation device 10 may include the dielectric antenna 180, the refractive-index-variable layer 120 arranged on the dielectric antenna 180, and the transparent conductive layer 141 and the metallic layer 130 that are arranged to have the dielectric antenna 180 and the refractive-index-variable layer 120 therebetween. The voltage source 190 which applies a voltage between the transparent conductive layer 141 and the metallic layer 130 is disposed.

The refractive-index-variable layer 120 is disposed on the dielectric antenna 180 to have the same width as the dielectric antenna 180, and has the same shape of a cross-section that is perpendicular to a thickness direction thereof as that of the dielectric antenna 180. The transparent conductive layer 141 arranged on the refractive-index-variable layer 120 may have the same shape of a cross-section as that of the refractive-index-variable layer 120.

The light modulation device 10 may further include the spacer layer 160 which is arranged between the metallic layer 130 and the dielectric antenna 180. The spacer layer 160 may be formed of a dielectric material having a refractive index smaller than that of the dielectric antenna 180 or may have a thickness that may satisfy requirements for a distance between the dielectric antenna 180 and the metallic layer 130.

Figure 14:
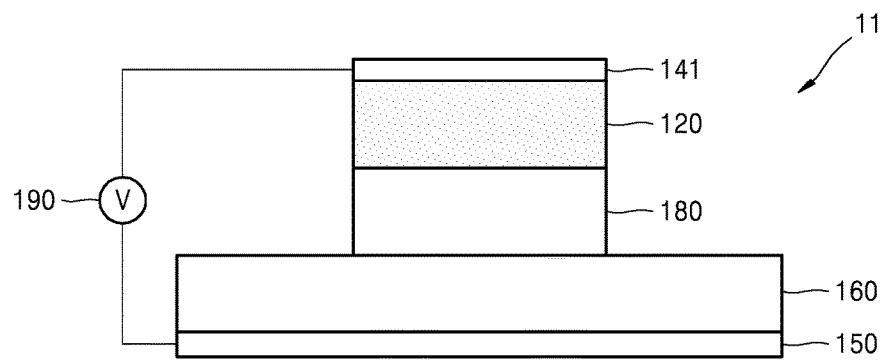
FIG. 14 is a cross-sectional view illustrating a schematic structure of a light modulation device according to another exemplary embodiment.

FIG. 14 is a cross-sectional view illustrating a schematic structure of a light modulation device 11 according to another exemplary embodiment.

The light modulation device 11 may include the dielectric antenna 180, the refractive-index-variable layer 120 arranged on the dielectric antenna 180, and the transparent conductive layers 141 and 150 arranged to have the dielectric antenna 180 and the refractive-index-variable layer 120 therebetween. The voltage source 190 which applies a voltage between the transparent conductive layers 141 and 150 is disposed.

The refractive-index-variable layer 120 is arranged on the dielectric antenna 180, and the transparent conductive layer 141 is arranged on the refractive-index-variable layer 120. The dielectric antenna 180, the refractive-index-variable layer 120, and the transparent conductive layer 141 may have the same shape of cross-sections that are perpendicular to a thickness direction thereof. The light modulation device 11 may further include the spacer layer 160 which is formed of a dielectric material and is arranged between the transparent conductive layer 150 and the dielectric antenna 180.

Figure 15:
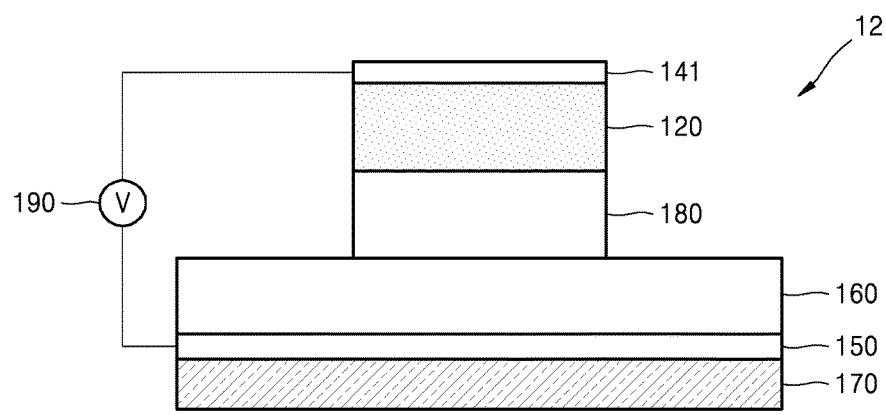
FIG. 15 is a cross-sectional view illustrating a schematic structure of a light modulation device according to another exemplary embodiment.

FIG. 15 is a cross-sectional view illustrating a schematic structure of a light modulation device 12 according to another exemplary embodiment.

The light modulation device 12 may include the dielectric antenna 180, the refractive-index-variable layer 120 arranged on the dielectric antenna 180, and the transparent conductive layers 141 and 150 arranged to have the dielectric antenna 180 and the refractive-index-variable layer 120 therebetween. The voltage source 190 which applies a voltage between the transparent conductive layers 141 and 150 is disposed.

The refractive-index-variable layer 120 is arranged on the dielectric antenna 180, and the transparent conductive layer 141 is arranged on the refractive-index-variable layer 120. The dielectric antenna 180, the refractive-index-variable layer 120, and the transparent conductive layer 141 may have the same shape of cross-sections that are perpendicular to a thickness direction thereof. The light modulation device 12 may further include the spacer layer 160 which is arranged between the transparent conductive layer 150 and the dielectric antenna 180, and the dielectric mirror 170 which is arranged under the transparent conductive layer 150.

Figure 16:
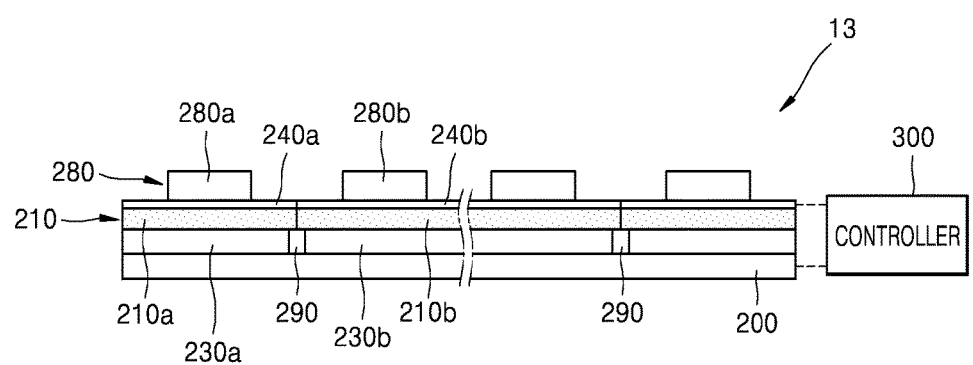
FIG. 16 is a cross-sectional view illustrating a schematic structure of a light modulation device according to another exemplary embodiment.

FIG. 16 is a cross-sectional view illustrating a schematic structure of a light modulation device 13 according to another exemplary embodiment.

The light modulation device 13 may include a dielectric antenna 280 and a refractive-index-variable layer 210 that faces the dielectric antenna 280 and includes a material having a refractive index changing according to an external signal.

The light modulation device 13 may include a plurality of light modulation cells. The dielectric antenna 280 may include a plurality of dielectric antenna cells 280a and 280b. The refractive-index-variable layer 210 may include a plurality of refractive-index-variable cells 210a and 210b that face the plurality of dielectric antenna cells 280a and 280b, respectively.

The light modulation device 13 may further include a refractive-index change adjustment unit that adjusts a refractive-index change of each of the plurality of refractive-index-variable cells 210a and 210b. The refractive index change adjustment unit may include a plurality of pairs of electrode portions that are arranged to have the plurality of refractive-index-variable cells 210a and 210b therebetween, respectively, and a controller 300 that controls a voltage applied to each of the plurality of pairs of electrode portions.

A transparent conductive layer 240a and a metallic layer 230a are a pair of electrodes to which a voltage for forming an electric field on the refractive-index-variable cell 210a is applied, and a transparent conductive layer 240b and a metallic layer 230b are a pair of electrodes to which a voltage for forming an electric field on the refractive-index-variable cell 210b is applied.

The transparent conductive layers 240a and 240b may be connected to each other, such that the same voltage may be applied to the transparent conductive layers 240a and 240b, and an insulating partition 290 may be arranged between the metallic layers 230a and 230b to insulate the metallic layers 230a and 230b from each other. With this structure, a refractive index of each of the refractive-index-variable cells 210a and 210b may be independently controlled.

The plurality of metallic layers 230a and 230b are disposed on a driving circuit unit 200, and the controller 300 controls a voltage applied to each of the plurality of metallic layers 230a and 230b through the driving circuit unit 200. The driving circuit unit 200 may include, for example, a transistor array.

With the above-described structure, the light modulation device 13 may have an array of a plurality of light modulation cells, each of which is controlled to modulate incident light into various forms. For example, the controller 300 applies a voltage to the transparent conductive layers 240a and 240b and the metallic layers 230a and 230b to independently control refractive indices of the plurality of refractive-index-variable cells 210a and 210b.

The controller 300 controls a voltage applied to each of a plurality of pairs of electrode portions, such that the light modulation device 13 modulates the intensity of incident light or the phase of the incident light.

The light modulation device 13 may function as a beam steering device which changes the direction of incident light. By giving proper regularity to phase modulation occurring in an individual light modulation cell, the incident light may be steered in a desired direction.

Figure 17:
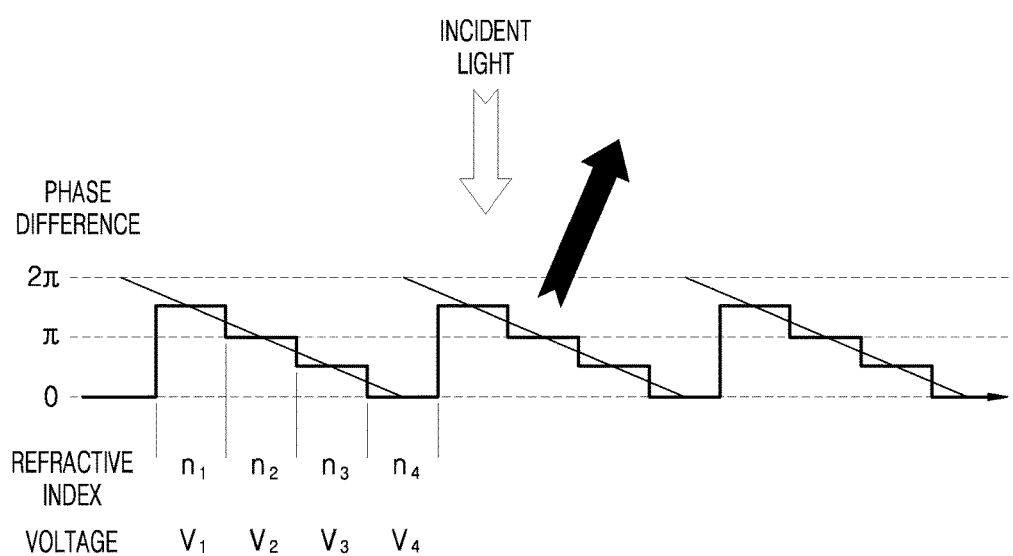
FIG. 17 is a conceptual view illustrating a possibility of a light modulation device of FIG. 16 being capable of operating as a beam steering device.

FIG. 17 is a conceptual view illustrating a possibility of the light modulation device 13 of FIG. 16 being capable of operating as a beam steering device.

Referring to FIG. 17, in the plurality of light modulation cells of the light modulation device 13, refractive indices of respective refractive-index-variable layers are controlled to cause phase modulation of $3\pi/2$, $\pi$, $\pi/2$, and 0. For example, to cause phase modulation of $3\pi/2$, $\pi$, $\pi/2$, and 0, a refractive index of a refractive-index-variable layer of a corresponding light modulation cell needs to be adjusted to different values of $n_1$, $n_2$, $n_3$, and $n_4$, and t a voltage between electrodes in opposite sides of a refractive-index-variable layer may be controlled to $V_1$, $V_2$, $V_3$, and $V_4$.

If adjacent light modulation cells are controlled to have the above described phase change rules, that is, stepwise phase modulation distribution, incident light is steered perpendicularly to a straight line connecting phase change values, which is beam steering using an optical phased array scheme and variously adjusts the steering direction of the incident light by adjusting the phase array rules.

Although the incident light is steered in one direction in the description, the incident light may be steered in different directions for different regions for beam shaping. For example, the light modulation device 13 may include a plurality of regions, each of which includes a plurality of light modulation cells, and may perform beam shaping in a desired form by steering beams in different directions for different regions.

Each individual light modulation cell included in the light modulation device 13 of FIG. 16 is described as an element of the light modulation device 1 of FIG. 1, but this is an example, and a light modulation cell of the light modulation devices 2 through 12 illustrated in FIGS. 6 through 13 may be used.

In addition, it has been described that the transparent conductive layers 240a and 240b are connected to each other to receive the same voltage and the metallic layers 230a and 230b are insulated by the insulating partition 290, but this is an example, and the exemplary embodiments are not limited thereto. For example, the metallic layers 230a and 230b may be connected to receive the same voltage, and the transparent conductive layers 240a and 240b may be insulated from each other, to control light modulation cell individually.

As is apparent from the foregoing description, the above-described light modulation device has a low light loss and a wide control range of light modulation by using a dielectric antenna.

Because the light modulation device has a dielectric antenna, the light modulation device may be more easily manufactured than an optical modulator having a plasmonic antenna.

The light modulation device may perform intensity modulation or phase modulation of incident light by using a resonance characteristic change of the dielectric antenna with respect to a refractive-index change of the refractive-index-variable layer, and may adjust a direction of the incident light or output of the incident light after performing beam shaping with respect to the incident light.

Furthermore, the light modulation device may be adopted in various optical devices using the foregoing functions to improve the performance of the optical devices.

While the light modulation device has been shown and described in connection with the exemplary embodiments, it will be apparent to those of ordinary skill in the art that modifications and variations may be made without departing from the spirit and scope of the exemplary embodiments as defined by the appended claims. Therefore, the disclosed exemplary embodiments should be considered in an illustrative sense rather than a restrictive sense. The range of the exemplary embodiments will be in the appended claims, and all of the differences in the equivalent range thereof should be understood to be included in the exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the appended claims.

What is claimed is:

1. A light modulation device comprising:
    a dielectric antenna;
    a refractive-index-variable layer which faces the dielectric antenna and comprises a material having a refractive index that changes according to a voltage applied thereto;
    a first conductive layer disposed above the refractive-index-variable layer; and
    a second conductive layer, disposed below the refractive-index-variable layer;
    wherein a voltage applied between the first conductive layer and the second conductive layer applies the voltage to the refractive-index-variable layer;
    wherein resonance characteristics of the dielectric antenna is adjustable by application of the voltage to the refractive-index-variable layer and distance between the dielectric antenna and the second conductive layer.

2. The light modulation device of claim 1, wherein a width of a cross-section of the dielectric antenna is equal to or less than $\lambda/2$ if a wavelength of light to be modulated by the light modulation device is $\lambda$.

3. The light modulation device of claim 1, wherein the refractive index of the refractive-index-variable layer is less than a refractive index of the dielectric antenna.

4. The light modulation device of claim 1, wherein the dielectric antenna comprises a material having a dielectric constant that is greater than about 10.

5. The light modulation device of claim 1, further comprising a signal application means configured to apply the voltage to the refractive-index-variable layer, thereby causing a change in the refractive index of the refractive-index-variable layer.

6. The light modulation device of claim 5, wherein the signal application means comprises a voltage source configured to apply the voltage between the first and second conductive layers.

7. The light modulation device of claim 1, wherein the dielectric antenna is arranged on the refractive-index-variable layer,
    the first conductive layer is arranged between the dielectric antenna and the refractive-index-variable layer.

8. The light modulation device of claim 7, wherein the first conductive layer comprises transparent conductive oxide.

9. The light modulation device of claim 7, wherein the second conductive layer comprises a metallic layer.

10. The light modulation device of claim 7, wherein the second conductive layer comprises transparent conductive oxide.

11. The light modulation device of claim 10, further comprising a dielectric mirror arranged under the second conductive layer.

12. The light modulation device of claim 7, further comprising a spacer layer arranged between the refractive-index-variable layer and the second conductive layer.

13. The light modulation device of claim 12, wherein the spacer layer comprises a dielectric material having a refractive index smaller than a refractive index of the dielectric antenna.

14. The light modulation device of claim 1, wherein the refractive-index-variable layer is arranged on the dielectric antenna,
    the first conductive layer is arranged on the refractive-index-variable layer.

15. The light modulation device of claim 14, further comprising a dielectric mirror arranged under the second conductive layer.

16. The light modulation device of claim 1, wherein the dielectric antenna comprises a plurality of dielectric antenna cells, and
    the refractive-index-variable layer comprises a plurality of refractive-index-variable cells that face the plurality of dielectric antenna cells, respectively.

17. The light modulation device of claim 16, further comprising:
    a refractive-index change adjustment unit configured to adjust a refractive-index change of each of the plurality of refractive-index-variable cells.

18. The light modulation device of claim 17, wherein the refractive-index change adjustment unit comprises:
    a plurality of pairs of electrode portions, each of which being configured to have the plurality of refractive-index-variable cells therebetween; and
    a controller configured to control a voltage applied to each of the plurality of pairs of electrode portions.

19. The light modulation device of claim 18, wherein the controller is further configured to control a voltage to be applied to the plurality of pairs of electrode portions such that the light modulation device modulates an intensity of light.

20. The light modulation device of claim 18, wherein the controller is further configured to control a voltage to be applied to the plurality of pairs of electrode portions such that the light modulation device modulates a phase of light.

21. The light modulation device of claim 20, wherein the controller is further configured to control the voltage to be applied to the plurality of pairs of electrode portions such that phase modulation distribution has a stepwise form.

22. An optical device comprising a light modulation device, the light modulation device comprising:
    a dielectric antenna;
    a refractive-index-variable layer which faces the dielectric antenna and comprises a material having a refractive index that changes according to a voltage applied thereto;
    a first conductive layer disposed above the refractive-index-variable layer; and
    a second conductive layer, disposed below the refractive-index-variable layer;
    wherein a voltage applied between the first conductive layer and the second conductive layer applies the voltage to the refractive-index-variable layer;
    wherein resonance characteristics of the dielectric antenna is adjustable by application of the voltage to the refractive-index-variable layer and distance between the dielectric antenna and the second conductive layer.

* * * * *